US012135574B2

(12) United States Patent
Duff

(10) Patent No.: US 12,135,574 B2
(45) Date of Patent: Nov. 5, 2024

(54) BIASING CONTROL FOR COMPOUND SEMICONDUCTORS

(71) Applicant: Semtech Corporation, Camarillo, CA (US)

(72) Inventor: Christopher Iain Duff, Lancashire (GB)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 17/817,813

(22) Filed: Aug. 5, 2022

(65) Prior Publication Data

US 2024/0045461 A1 Feb. 8, 2024

(51) Int. Cl.
*G05F 3/24* (2006.01)
*G05F 3/20* (2006.01)

(52) U.S. Cl.
CPC .............. *G05F 3/205* (2013.01); *G05F 3/242* (2013.01)

(58) Field of Classification Search
None
See application file for complete search history.

(56) References Cited

U.S. PATENT DOCUMENTS 4,246,517 A * 1/1981 Dakroub .............. H05B 39/083 315/307
4,710,730 A * 12/1987 Doyle, III .............. H03B 5/364 331/160
4,905,257 A * 2/1990 Palkert ................ H04L 25/4904 375/333
5,208,557 A * 5/1993 Kersh, III .............. H03K 3/354 331/74
5,544,120 A * 8/1996 Kuwagata ............. G11C 11/406 331/66
5,545,977 A * 8/1996 Yamada .................. G05F 3/245 323/907
6,114,901 A 9/2000 Singh et al.
6,861,739 B1 * 3/2005 Bhavnagarwala .. H01L 23/5286 257/691
6,864,693 B2 * 3/2005 Kondo ............... G01R 31/2884 324/719
7,483,303 B2 * 1/2009 Lee ........................ G11C 16/12 365/189.09
8,283,969 B2 * 10/2012 Okamoto ............. H03H 11/245 327/536

(Continued)

OTHER PUBLICATIONS

Extended European Search Report for EP Patent Application No. 23179850.5 dated Dec. 22, 2023 (10 pages).

*Primary Examiner* — Thomas J. Hiltunen
(74) *Attorney, Agent, or Firm* — Alston & Bird LLP

(57) ABSTRACT

A compound semiconductor integrated circuit is disclosed, which includes biasing circuitry for generating a bias voltage at a bias output node. The biasing circuitry comprises a first circuit branch configured to extend between a defined voltage and a supply voltage. The first circuit branch includes a first transistor configured as a current source to generate a defined current in the first circuit branch and a controllably variable resistance. The bias output node is coupled to the first circuit branch at a first node which is between the controllably variable resistance and the first transistor. The biasing circuitry is operable so that the resistance value of the controllably variable resistance varies with a control voltage so as to vary the value of the bias voltage.

14 Claims, 2 Drawing Sheets

(56) References Cited

U.S. PATENT DOCUMENTS

| | | | | |
|---|---|---|---|---|
| 8,502,323 | B2 * | 8/2013 | Chen | H01L 29/402 257/E27.061 |
| 8,988,138 | B1 * | 3/2015 | Kumazaki | G11C 16/30 327/539 |
| 8,994,399 | B2 * | 3/2015 | Ali | H03H 11/30 326/21 |
| 9,280,169 | B2 * | 3/2016 | Bouwman | G05F 3/16 |
| 9,450,568 | B1 | 9/2016 | Hawkins et al. | |
| 10,386,881 | B2 * | 8/2019 | Yang | G05F 3/242 |
| 10,786,665 | B2 * | 9/2020 | Marnfeldt | A61N 1/05 |
| 10,911,045 | B1 * | 2/2021 | Ming | H03K 17/145 |
| 11,209,846 | B2 * | 12/2021 | Satou | G05F 1/468 |
| 11,380,723 | B2 * | 7/2022 | Ayel | H01L 27/14616 |
| 2004/0257148 | A1 * | 12/2004 | Tobita | H02M 3/073 327/536 |
| 2009/0002084 | A1 * | 1/2009 | Inoue | H03B 5/1203 257/E27.014 |
| 2010/0066453 | A1 | 3/2010 | Busking et al. | |
| 2014/0266314 | A1 * | 9/2014 | Iriarte | H03K 5/2472 327/81 |
| 2017/0047897 | A1 | 2/2017 | Kaper | |

* cited by examiner

BIASING CONTROL FOR COMPOUND SEMICONDUCTORS

TECHNICAL FIELD

The present disclosure is related to apparatus and methods for controlling biasing, in particular for components such as transistors, in compound semiconductor technology.

BACKGROUND

Many electronic circuits require some biasing of the circuit components for correct operation. For instance, circuits comprising transistors may require setting a bias point for each transistor, where the static, or quiescent, nodal voltages and currents are set.

In some cases, the relevant bias point may be fixed in operation, for instance according to design requirements for the particular application. In at least some implementations it may, however, be advantageous to be able to controllably vary the bias point. For example, the ability to vary the bias point may be advantageous during a manufacturing setup process, so as to allow optimization of the circuitry. In some applications, varying the bias point may be beneficial to ensure correct start-up of the circuitry, in particular where there may be multiple supply voltages and/or multiple transistors. In some cases, it may be beneficial to dynamically vary the bias point in use, e.g. in response to operating conditions or to enable different modes of operation.

Many electronic circuits may be implemented as integrated circuits on a silicon die, e.g. using CMOS technology, and, in that case, control circuitry for controllably varying the bias point may be implemented as part of the integrated circuit using complementary transistors, e.g. using PMOS and/or NMOS transistors to form a stable, controllable, bias voltage. In some applications, however, there can be advantages in forming the circuitry in a compound semiconductor material system, e.g. such as GaAs (gallium arsenide). GaAs integrated circuits have been proposed for use in some applications, such as for high-speed communications, e.g. as amplifiers, drivers or receivers for optical or other high-speed communications, as GaAs may offer better performance than conventional silicon in such applications, e.g. with better linearity and speed performance. Other compound semiconductors may be advantages for some applications.

In such compound semiconductor material systems, complementary transistors are generally not available. Often, therefore, the bias point of the components, such as transistors, formed in compound semiconductor integrated circuits may be fixed and non-variable. Alternatively some bias point control may be implemented by some external circuitry for setting the bias point, i.e. some off-chip circuitry that is not integrated as part of the compound semiconductor circuit to provide a variable bias point. However, generally it is desirable to avoid the need for external, i.e. off-chip components, for savings in cost and size,

SUMMARY

Embodiments of the present disclosure relate to improved methods and apparatus for biasing control in compound semiconductor technology.

According to some embodiments there is provided a compound semiconductor integrated circuit comprising biasing circuitry for generating a bias voltage at a bias output node. The biasing circuitry comprises a first circuit branch configured to extend between a defined voltage and a supply voltage. The first circuit branch comprises a first transistor configured as a current source to generate a defined current in the first circuit branch and a controllably variable resistance. The bias output node is coupled to the first circuit branch at a first node, which is between the controllably variable resistance and the first transistor. The biasing circuitry is operable so that the resistance value of the controllably variable resistance varies with a control voltage so as to vary the value of the bias voltage.

In some examples, the controllably variable resistance comprises a second transistor in parallel with a fixed resistor. In some examples, the integrated circuit may further comprise a second circuit branch extending between a node for receiving the control voltage and the supply voltage. The second circuit branch may comprise a third transistor configured as a current source to generate a defined current in the second circuit branch and a level-shift resistor. A control input of the second transistor may be connected to the second circuit branch at a node which is between the level-shift resistor and the third transistor. The biasing circuit may be configured to operate with the supply voltage being negative and the control voltage being positive to generate the bias voltage as a negative voltage.

In some examples, the integrated circuit further comprises a first series resistor located in the first circuit branch between the controllably variable resistance and the first transistor, wherein the bias output node is coupled to the first node of the first circuit branch which is between the first series resistor and the first transistor. A second series resistor may be located in the first circuit branch between the first series resistor and the first transistor. The bias output node may be coupled to the first node of the first circuit branch which is between the first series resistor and the second series resistor.

In some examples, the integrated circuit may further comprise a control voltage terminal for receiving the control voltage and a hardware mode select terminal, wherein the hardware mode select terminal is connected to a second node of the first circuit branch which is between the first node and the controllably variable resistance. The biasing circuitry may be operable: in a hardware set mode, with the control voltage terminal left floating the hardware mode select terminal connected to the defined voltage, to generate the bias voltage as a fixed defined bias voltage; and in a variable mode, with control voltage terminal connected to receive the control voltage and the hardware mode select terminal left floating, to generate the bias voltage based on the control voltage.

In some examples, the compound semiconductor integrated circuit may further comprise a circuit with at least one circuit component biased by the bias voltage at the bias output node. The at least one circuit component biased by the bias voltage at the bias output node may comprise a first circuit transistor. The first transistor of the biasing circuitry may have matching characteristics to the first circuit transistor. The least one circuit component biased by the bias voltage at the bias output node may comprise at least one of a driver, a receiver and an amplifier for data communication.

In some examples, the compound semiconductor may be gallium arsenide.

Aspects also relate to a system comprising the compound semiconductor integrated circuit of any of the embodiments described herein and a controller for controllably setting the control voltage so as to control the bias voltage. The controller may be configured to monitor at least one system parameter and to controllably set the control voltage based on the at least one system parameter. The at least one system parameter may comprise at least one of: a bias current; a bias voltage; temperature of the integrated circuit; a signal gain; a signal magnitude; a figure of merit for performance; and a system operating mode. The controller may be configured to be operable in a test or evaluation mode to set the bias voltage for one or more of: testing; validation; characterization; reliability assessment or debug.

Aspects also relate to an electronic device comprising the compound semiconductor integrated circuit of any of the described embodiments or any of the systems comprising the compound semiconductor integrated circuit.

In a further aspect there is provided a compound semiconductor integrated circuit comprising biasing circuitry for generating a bias voltage, the biasing circuitry comprising: a first transistor configured as a current source to generate a defined current through a controllably variable resistance.

In a yet further aspect there is provided a compound semiconductor integrated circuit comprising biasing circuitry for generating a bias voltage wherein the biasing circuitry is configured such that the bias voltage is controllably variable based on a received control voltage.

BRIEF DESCRIPTION OF THE DRAWINGS

To better explain various embodiments and examples of the present disclosure and the principles, example implementation and operation thereof, reference will now be made, by way of example, to the following drawings, in which.

DETAILED DESCRIPTION

Embodiments of the present disclosure relate to methods and apparatus for bias point control for compound semiconductor technology.

Compound semiconductor technology, i.e. where the semiconductor is formed as a compound of two or more elements, may be used for fabricating integrated circuits (ICs) in some applications, instead of the more common, single element, silicon semiconductor technology. Various compound semiconductor technologies are known, such as gallium arsenide (GaAs), silicon carbide (SiC) and indium phosphide (InP) for example. Such compound semiconductors can offer advantages for particular applications, for instance GaAs has been used for high-speed data drivers due to beneficial speed and linearity performance.

As discussed above, for such compound semiconductor technologies, complementary transistors, which are routinely used in silicon ICs for variable bias point control, may not be available. Such compound semiconductor ICs may therefore be implemented with a fixed bias point control.

Figure 1:
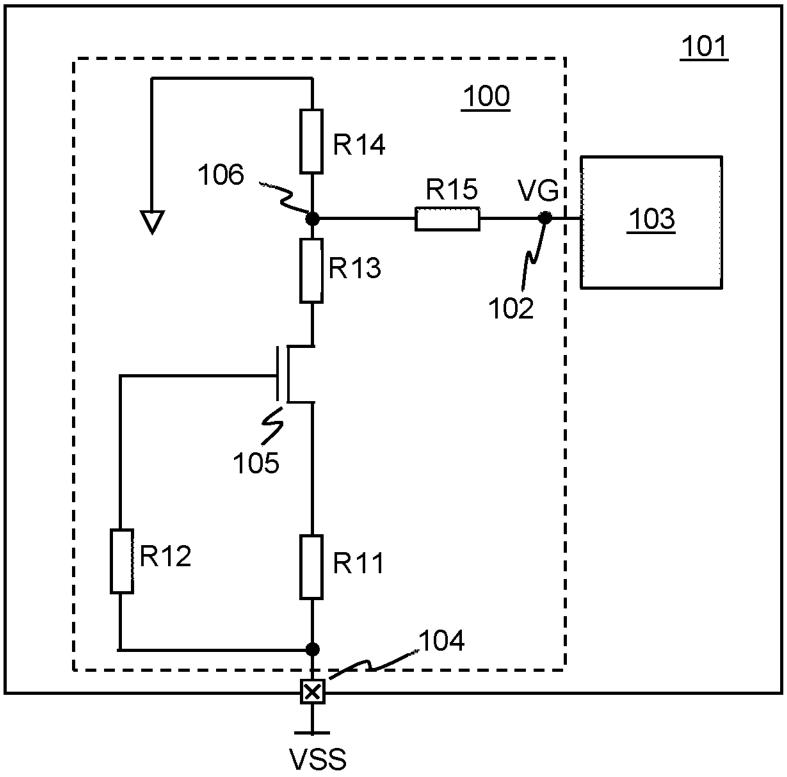
FIG. 1 illustrates one example of biasing circuitry with fixed bias point control for a compound semiconductor circuit.

FIG. 1 illustrates one example of conventional biasing circuitry 100 for biasing components of a compound semiconductor IC 101. FIG. 1 illustrates that the biasing circuitry 100 generates a controlled voltage VG at a bias output node 102, which provides biasing to one or more components of circuit 103.

There are various ways in which the bias voltage VG may be used to provide biasing of the circuit 103, as will be understood by one skilled in the art. For example, the circuit 103 could comprise at least one transistor, such as a FET, with the bias voltage VG being applied to the gate of at least one transistor to set its operating point. In some cases, the circuit 103 may comprise a plurality of transistors, each biased from the voltage VG at the biasing node. The bias voltage VG could additionally or alternatively be applied to some other circuit component which requires a set potential. In some cases the circuit may comprise a buffer, or follower or intermediate circuit configured to follow the voltage VG at the biasing output node 102 to provide biasing for other circuit components. One skilled in the art will be aware of a variety of ways in which the bias voltage VG may be used for biasing.

As will be understood by one skilled in the art, for biasing of transistors in a compound semiconductor material such as GaAs the bias voltage VG may need to be negative. The example biasing circuitry of FIG. 1 thus receives a negative supply VSS, for instance at a terminal 104, and generates a negative bias voltage VG.

The biasing circuitry 100 of FIG. 1 comprises a transistor 105, such as a depletion mode FET, configured such that its gate connects to the supply voltage via resistor R12. Resistor R12 may have a relatively high value of resistance, say of the order of thousands of ohms for example, so as to limit current and provide a degree of electrostatic discharge (ESD) protection at the gate of transistor 105. The source of the transistor 105 is connected to the negative supply VSS via resistor R11 and the potential difference, in use, across R11 arising from the drain-source current Ids through transistor 105 and resistor R11, acts to provide negative feedback across the gate-source junction of the transistor 105. This gate-source voltage Vgs acts, through the transconductance of transistor 105, to control the drain-source current Ids, with a value that depends on the channel width of the transistor 105 and the value of resistor R11. This current sets the quiescent current through resistors R13 and R14, and thus (based on the value of resistor R14) the voltage at node 106, with the value of R13 being selected to set the potential at the drain of transistor 105 so that it operates in the saturation region of its output characteristic. This arrangement thus provides a nominally fixed potential at node 106, and hence a nominally fixed bias voltage VG at the bias output node 102, which is tolerant to variations of the supply voltage VSS (subject to the output conductance of the transistor 105). The value of resistor R15, located in the path between node 106 and the bias output node 102, may be selected with consideration to any potential difference caused by current draw from the bias output node 102 by the circuit 103.

If the circuit 103 biased by the biasing circuitry 100 comprise at least one circuit transistor which is similar to the transistor 105, with similar bias points, i.e. matches the characteristics of the transistor 105 to within a certain tolerance, the biasing circuitry 100 may substantially track with any process, temperature and voltage (PVT) variations such that the overall effect of any such variations on performance is minimized. This biasing circuitry arrangement 100 thus provides a nominally fixed quiescent bias point for the relevant components of circuit 103 controlled from the bias output node 102 and therefore a nominally fixed operating point for such components.

As discussed above, however, it may be advantageous in some applications to enable a controllably variable bias point. This may allow the bias point to optimized, after circuit fabrication, as part of a device set-up or initialisation and/or may enable the bias point, and hence operating point, to be dynamically varied in use. For instance it might be desirable to be able to dynamically vary the bias point to provide a trade off between power and performance, e.g. to enable different modes such as a higher power, higher performance mode and a lower power, but lower performance mode.

Such variable bias control could potentially be implemented using external, i.e. off-chip, circuitry to provide a controlled bias to the compound semiconductor IC, however the use of external control circuitry can add to the size and cost of the device and providing good matching for PVT variations may be more challenging.

Embodiments of the present disclosure relate to biasing circuitry which can be implemented as part of a compound semiconductor integrated circuit and which allows for a variable bias point control.

Figure 2:
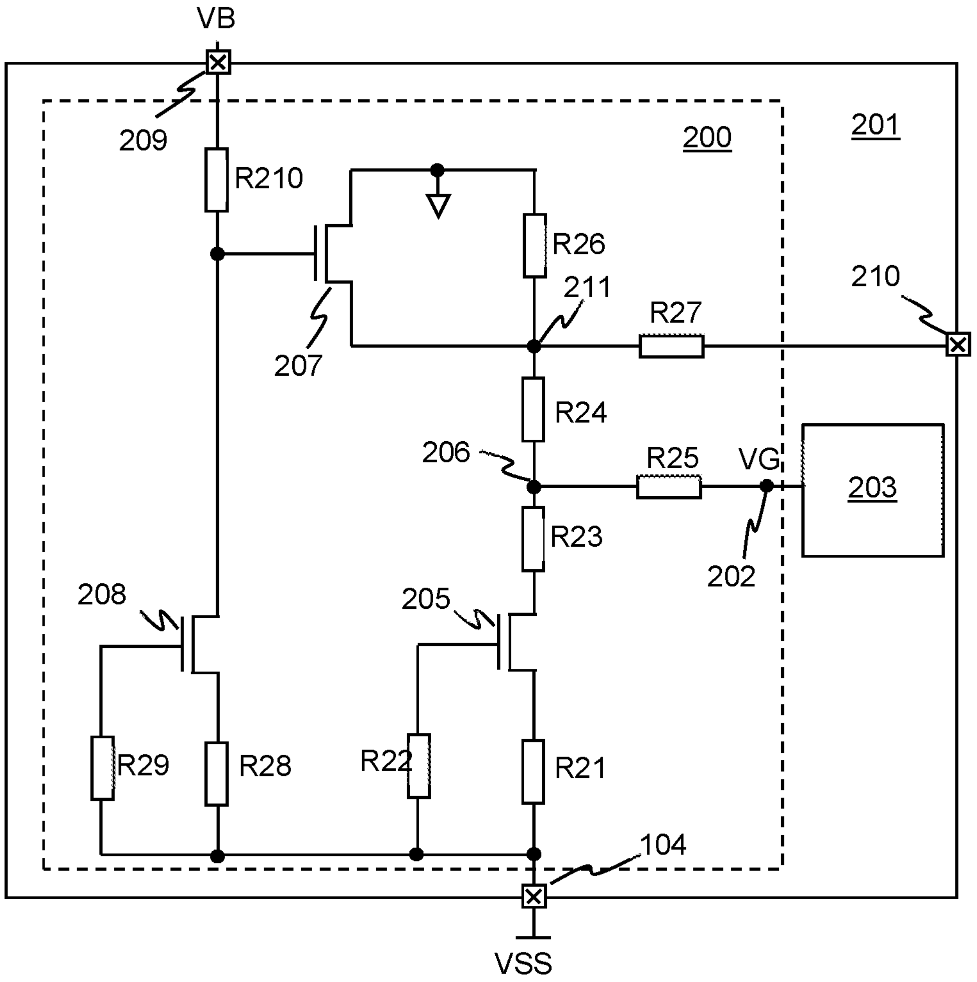
FIG. 2 illustrates one example of biasing circuitry with a variable bias point control for a compound semiconductor circuit according to an embodiment.

FIG. 2 illustrates one example of biasing circuitry 200 according to an embodiment. The biasing circuitry 200 is formed as part of a compound semiconductor integrated circuit 201 and is configured to generate a bias voltage VG at a bias output node 202 for biasing of components of circuit 203 in a similar fashion as described with reference to FIG. 1.

The biasing circuitry 200 receives a supply voltage VSS, which may be a negative supply voltage, e.g. at a supply terminal 104, and comprises a first transistor 205 configured with resistors R21, R22, R23, R24 and R25 in a similar manner as transistor 105 and resistors R11, R12, R13, R14 and R15 discussed with reference to FIG. 1. Thus, in operation, first transistor 205 is controlled to deliver a defined drain-source current Ids1, which is stabilised against variations in the supply voltage VSS by negative feedback from the potential difference across resistor R21—with relatively large resistor R22 again ensuring minimal gate current and providing some ESD protection.

As discussed with reference to FIG. 1, the current Ids1 through the first transistor 205 defines the current through resistors R24 and R23 to generate a voltage at node 206, connected to the biasing output node 202 via resistor R25. As also discussed with reference to FIG. 1, the first transistor 205 may be similar, with similar bias points, to at least one transistor of the circuit 203 biased by the voltage VG so that the biasing circuitry 200 may substantially track with any PVT variations.

In the embodiment of FIG. 2, however, the biasing circuitry 200 includes resistor R26 in parallel with second transistor 207, the parallel combination of resistor R26 and the second transistor being connected in series between resistor R24 and a defined voltage, e.g. ground.

In use, if the gate of the transistor 207 is controlled so that the second transistor 207 is fully turned on, with a low channel resistance, then substantially all the defined current Ids1 (defined by the first transistor) will flow via the low resistance channel of the second transistor 207. In effect the resistor R24 is connected to the defined voltage by the negligible on-resistance of the second transistor 207 and the resistor R26 is substantially bypassed. Thus, the value of the bias voltage VG is substantially determined by the voltage drop across resistor R24 as discussed with reference to FIG. 1.

However, if the channel of the second transistor 207 is pinched fully off, so that all the defined current Ids1 flows via the resistor R26, the value of the bias voltage VG is determined by the voltage drop across resistors R26 and R24 in series, i.e. the additional voltage drop across resistor R26 lowers (in this example) the bias voltage VG.

The bias voltage VG can thus be controllably varied between a first bias value, when second transistor 207 is fully off and a second bias value, when the second transistor 207 is fully on. In this example, the first and second bias values are both negative, with the first bias value being more negative than the second bias value, i.e. being a negative bias voltage with a greater magnitude. The values of resistors R26 and R24 may be set, with regard to the defined current Ids1, to define appropriate first and second bias values of the bias voltage VG, to provide the desired range of bias voltage for a particular application.

In effect, the first transistor 205 can be seen as being configured as a current source in a first circuit branch to define a current through the first circuit branch. The parallel combination of the second transistor 207 and resistor R26 can be seen as providing a variable resistance in the first circuit branch. The bias voltage depends, at least partly, on a voltage drop across the variable resistance due to the defined current. Controllably varying the value of the variable resistance results in a variation of this voltage drop and a resultant variation in bias voltage.

To control the second transistor 207, the biasing circuitry 200 comprises a third transistor 208 coupled between a control voltage VB and the supply voltage VSS. In some cases the relevant control voltage VB could be generated on-chip by some integrated control circuitry. In at least some applications, however, the control voltage VB may be generated externally and received via a suitable terminal 209 as illustrated in FIG. 2.

The source of the third transistor 208 is, in this example, coupled to the supply voltage VSS by resistor R28, with negative feedback to the gate of the third transistor 208 via resistor R29. The third transistor, with resistors R28 and R29, effectively acts as a current source in a similar manner as the first transistor 205 with resistors R21 and R22, but it will be understood that the third transistor can be of different scaling to the first transistor and the values of the associated resistors may also be scaled. The drain-source current Ids3 of the third transistor 208 flows through resistor R210 to provide a level shift of the control voltage VB, with the gate of the second transistor 207 being controlled by this level shifted voltage. This arrangement allows for the control voltage VB to be a positive voltage. This is advantageous as it may, generally, be simpler and/or more convenient to generate a positive control voltage. For instance, a positive control voltage could be generated from a controlled voltage source or via a DSP or DAC and/or generated from an external controller, such as a standard microprocessor or microcontroller. Typically, conventional microcontrollers or microprocessor would not have the ability to readily provide a negative control voltage.

The second circuit branch may be arranged such that if the control voltage VB is a first control value, say 0V, the voltage drop across resistor R210 is such that the gate-source voltage of the second transistor means that the channel of the second transistor 207 is fully pinched off. As the control voltage VB is increased to be more positive, the change in gate-source voltage of the second transistor 207 results in the channel of the second resistor turning on, until, for some second control value of the control voltage VB, the channel of the transistor 207 is effectively fully on.

Thus, varying the value of the control voltage VB from the first control value to the second control value can vary the bias voltage VG from the first bias value to the second bias value. Varying the control voltage VB to any intermediate value between the first and second control values can result in an intermediate bias value. The control voltage could therefore be controlled to vary between the first and second control values and/or between any one or more intermediate values. The control voltage may be varied in any desired way, e.g. stepwise or in a substantially analogue fashion over at least part of the range, depending on the application and the way that the control voltage is generated.

This enables freedom in control of the bias voltage VG, and hence control over the bias point, and hence operating point, of the relevant components of circuit 203. The relevant bias voltage VG, within the range of the first and second bias values inclusive, may be set on-chip according to the requirement of the circuit 203.

The bias voltage VG could be set to provide a particular trade off between power and performance as part of some device optimization process. In some cases, the bias voltage VG may be variable in use so as to controllably vary performance and/or power consumption, possibly according to the operating conditions or mode of the circuit 203 biased using the bias voltage VG. This could, for instance implement one or more different operating modes, such as a low power mode or a high-performance mode.

Figure 3:
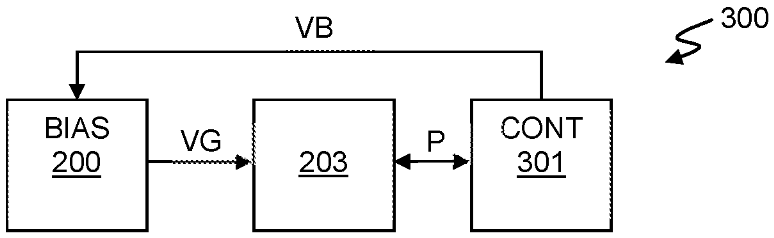
FIG. 3 illustrates one example of a control loop for controlling the biasing circuitry of FIG. 2.

In some cases, some monitoring or measurement of parameters of the circuit 203, or the overall system of which the circuit 203 is a part, may be used as part of a control loop. The control voltage VB can be adjusted according to feedback and/or feedforward of the monitored circuit and/or system parameters. Such parameters could, for example, comprise at least one of: bias current or voltage; temperature; signal gain; signal magnitude (whether of an electrical signal or some other type of signal, such as an optical signal for optical data communication embodiments), a figure of merit for performance, and an operating mode. FIG. 3 illustrates one example of such a control loop 300. FIG. 3 illustrates that the biasing circuitry 200 generates the bias voltage VG for the circuit 203. A controller 301 monitors and/or sets at least one operating parameter P for the circuit 203, which could be any one or more of the parameters discussed above and based on said parameter provides the control voltage VB to the biasing circuitry 200. The controller 301 could be implemented as part of an integrated circuit together with circuit 203 and biasing circuitry 200, but may be implemented as an external, i.e. off-chip component to the circuit 203 and biasing circuitry 200, but as part of the same system or device.

In some cases, the bias voltage could additionally or alternatively be controllably varied as part of some testing or evaluation, for instance for one or more of testing, validation, characterization, reliability assessment or debug.

Whilst the ability to provide a controllably variable bias voltage VG is advantageous, for the reasons discussed, in some cases a device manufacturer may be content to operate with a fixed bias voltage set by the circuit design. A fixed bias voltage can be provided by the biasing circuitry 100 discussed with reference to FIG. 1 and a device manufacturer could therefore choose an integrated circuit 101 with the biasing circuitry 100 or an integrated circuit 201 with the biasing circuitry 200. However this would require a circuit manufacturer, who may be different to the device manufacturer, to offer two separate ICs.

Referring back to FIG. 2, the biasing circuitry 200 is configured to enable implementation in a controlled bias mode of operation, where the bias voltage VG depends on the applied control voltage VB as discussed above, but also to enable implementation in a hardware set mode, whether the bias voltage is fixed according to the circuit design.

To enable the hardware set mode, a hardware mode select terminal 210 is connected, via resistor R27, to node 211 located between resistor R24 and the parallel connection of second transistor 207 and resistor R26. To enable the hardware set mode of operation, the hardware mode select terminal 210 is tied to a local circuit ground (or other appropriate defined voltage corresponding to the defined voltage for the first circuit branch), and the control voltage terminal 209 is left floating. In this case, the gate potential of the second transistor 207 is pulled down towards the negative supply voltage VSS and the second transistor 207 will be in the off state. Thus resistor R24 is effectively connected to ground, via node 211, by resistors R26 and R27 in parallel. The value of resistor R27 can be selected to be relatively low, compared to the resistance of resistor R26, so that R27 dominates, and most of the drain-source current Ids1 drawn by the first transistor 205, flows via resistor R27. The bias voltage VG is thus a fixed, nominal voltage determined by the current Ids1 and the values of R24, R26 and R27, which can be selected to provide a desired value of bias voltage VG in the hardware set mode.

To enable the controlled bias mode, the hardware mode select terminal 210 can be left floating, and thus resistor R27 can effectively be considered to be out of circuit. The control voltage terminal 209 is then connected to receive a control voltage VB as discussed above.

The provision of hardware mode select terminal 210 connected to node 211 via resistor R27 thus enables a hardware set mode to be enabled, with a fixed bias voltage VG being generated without the need to generate a control voltage VB. It will be understood, however, that if the circuitry were designed for a specific application where a hardware set mode was not required, the hardware mode select terminal 210 and resistor R27 could be omitted.

It will also be understood that a fixed bias voltage VG could alternatively be achieved, without using the hardware mode select terminal 210 and without the need for specifically generating a control voltage, by permanently connecting the control voltage terminal 209 to ground. However, in that case, the bias voltage VG would have the first bias value, which provides the highest magnitude of negative bias that can be achieved when operating in the variable mode. For many applications, the biasing circuitry 200 may be designed so that the first bias value represents a bias value that may only be applicable in some applications or operating conditions and thus it may generally be expected that for a fixed bias implementation, the fixed bias desired would be lower in magnitude than the first bias value which is enabled in the variable mode. The provision of the hardware mode select terminal 210 and resistor R27 thus allow the bias voltage VG in the hardware set mode to have a magnitude lower than the first bias value, which may be more appropriate for a fixed bias.

The example biasing circuit discussed with reference to FIG. 2 includes fixed resistance R24 in series with the variable resistance provided by the parallel combination of the second transistor 207 and resistor R26. It will be understood that resistor R24 could be omitted in some implementations, with appropriate adjustments to the value of resistor R26 and to the control of the second transistor 207 such that it doesn't turn fully on and thus the resistance of the parallel combination of the second transistor 207 and resistor R26 does not drop below a value corresponding to a minimum magnitude value for the bias voltage VG. However, this would use only part of the operating range of the second transistor 207 and in general it is preferable to use the full operating range, i.e. from being fully on to fully off.

The examples above have been described in the context of the transistors of the biasing circuitry being depletion mode FETs, but it will be understood that other transistor technologies could be implemented with appropriate adjustments as would be understood by one skilled in the art.

In general therefore, embodiments relate to biasing circuitry which is operable to generate a controllably variable bias in a compound semiconductor integrated circuit. The biasing circuitry may comprise a first circuit branch comprising a first transistor configured as a current source to generate a defined current in the first circuit branch, wherein the first circuit branch also comprises a variable resistance configured such that the bias voltage depends, at least partly, on a voltage drop due to the defined current through the variable resistance. The variable resistance may be implemented by a second transistor in parallel with a fixed resistor. The second transistor may be controlled based on a control voltage. The biasing circuitry may receive a negative supply voltage and generate a negative bias voltage, but the control voltage need not be negative.

The compound semiconductor may be GaAs. In some cases, the integrated circuit may form part of a driver, amplifier or receiver circuit for communications, which may be for optical communications. Embodiments also relate to electronic devices including an amplifier arrangement as described herein.

It will be understood that the examples and embodiments described above are given by way of example only and those skilled in the art will understand that modifications, variations, additions or alterations may be made to specific embodiments described, or alternative embodiments may be implemented, without departing from the scope of the appended claims.

It should be noted that as used herein, unless expressly stated otherwise, the word "comprising" does not exclude the presence of other elements or steps other than those listed, references to an element or feature in the singular does not exclude the possibility of a plurality of such elements or features, and that recitation of different features or elements in the appended claims does not necessarily imply separate components; a single component or unit may fulfil the function of several elements recited in a claim. Any reference signs in the appended claims shall not be construed so as to limit their scope.

The invention claimed is:

1. A compound semiconductor integrated circuit comprising biasing circuitry for generating a bias voltage at a bias output node and at least a first circuit component biased by the bias voltage at the bias output node to set an operating bias point of the first circuit component, the biasing circuitry comprising: a first circuit branch configured to extend between a defined voltage and a supply voltage, the first circuit branch comprising:

- a first transistor configured as a current source to generate a defined current in the first circuit branch;
- a controllably variable resistance, wherein the bias output node is coupled to the first circuit branch at a first node which is between the controllably variable resistance and the first transistor, wherein the biasing circuitry is operable so that a resistance value of the controllably variable resistance varies with a control voltage so as to vary a value of the bias voltage, wherein the first transistor of the biasing circuitry has matching characteristics to the first circuit component so as exhibit a matched response to at least one of process, temperature and voltage variations; and

- a control voltage terminal for receiving the control voltage and a hardware mode select terminal, wherein the hardware mode select terminal is connected to a second node of the first circuit branch which is between the first node and the controllably variable resistance, wherein the biasing circuitry is operable:
  - in a hardware set mode, with the control voltage terminal left floating the hardware mode select terminal connected to the defined voltage, to generate the bias voltage as a fixed defined bias voltage; and
  - in a variable mode, with the control voltage terminal connected to receive the control voltage and the hardware mode select terminal left floating, to generate the bias voltage based on the control voltage.

2. The compound semiconductor integrated circuit of claim 1 wherein the controllably variable resistance comprises a second transistor in parallel with a fixed resistor.

3. The compound semiconductor integrated circuit of claim 2 further comprising a second circuit branch extending between a node for receiving said control voltage and said supply voltage, the second circuit branch comprising:

- a third transistor configured as a current source to generate a defined current in the second circuit branch; and
- a level-shift resistor;
- wherein a control input of the second transistor is connected to the second circuit branch at a node which is between the level-shift resistor and the third transistor.

4. The compound semiconductor integrated circuit of claim 3 wherein the biasing circuitry is configured to operate with the supply voltage being negative and the control voltage being positive to generate the bias voltage as a negative voltage.

5. The compound semiconductor integrated circuit of claim 1 further comprising a first series resistor located in the first circuit branch between the controllably variable resistance and the first transistor, wherein the bias output node is coupled to the first node of the first circuit branch which is between the first series resistor and the first transistor.

6. The compound semiconductor integrated circuit of claim 5 further comprising a second series resistor located in the first circuit branch between the first series resistor and the first transistor, wherein the bias output node is coupled to the first node of the first circuit branch which is between the first series resistor and the second series resistor.

7. The compound semiconductor integrated circuit of claim 1 wherein said first circuit component comprises a first transistor and wherein the first transistor of the biasing circuitry has matching characteristics to the first circuit transistor.

8. The compound semiconductor integrated circuit of claim 1 wherein the first circuit component biased by the bias voltage at the bias output node forms part of at least one of a driver circuit, a receiver circuit and an amplifier circuit for data communication.

9. The compound semiconductor integrated circuit of claim 1 wherein the compound semiconductor is gallium arsenide.

10. A system comprising the compound semiconductor integrated circuit of claim 1 and a controller for controllably setting the control voltage so as to control the bias voltage.

11. The system of claim 10 wherein the controller is configured to monitor at least one system parameter and to controllably set the control voltage based on the at least one system parameter.

12. The system of claim 11 where the at least one system parameter comprises at least one of: a bias current; a bias voltage; temperature of the compound semiconductor integrated circuit; a signal gain; a signal magnitude; a figure of merit for performance; and a system operating mode.

13. The system of claim 10 wherein the controller is configured to be operable in a test or evaluation mode to set the bias voltage for one or more of: testing; validation; characterization; reliability assessment or debug.

14. An electronic device comprising the compound semiconductor integrated circuit of claim 1.

* * * * *